Oct. 1, 1946.　　　　H. J. KEATING　　　　2,408,559
SELF-SETTING TUBULAR RIVET
Filed June 19, 1945
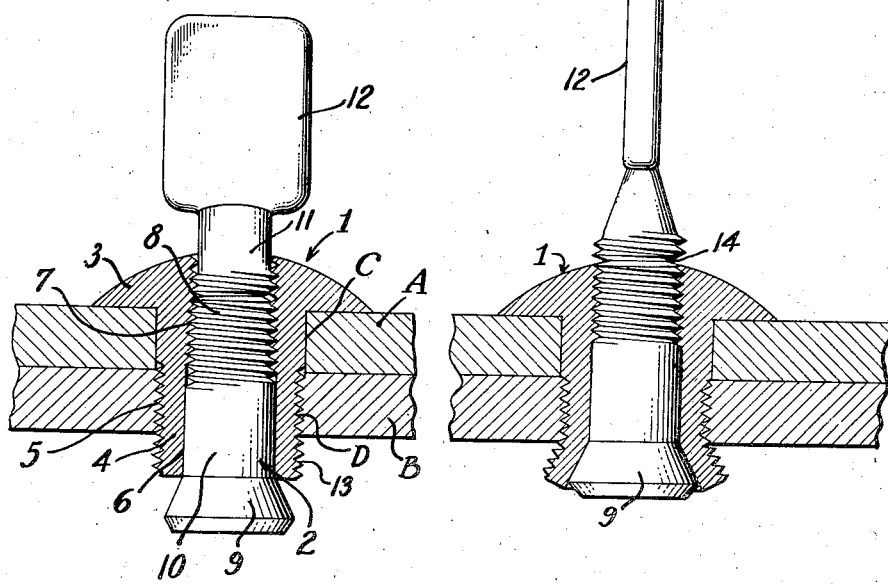
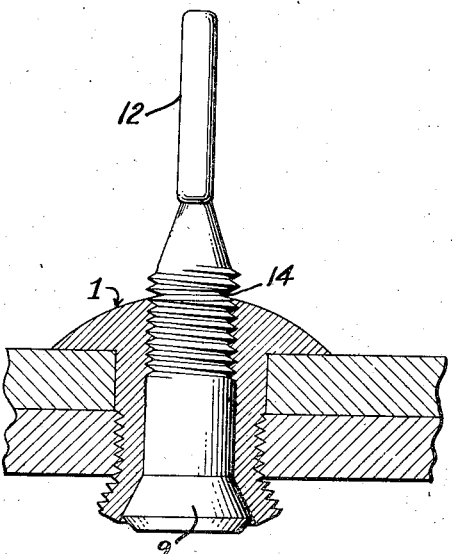
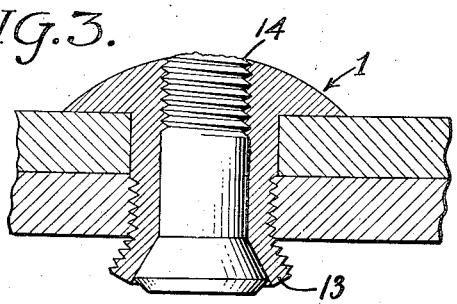
HERBERT J. KEATING,
INVENTOR.
BY
ATTORNEY Patented Oct. 1, 1946

2,408,559

UNITED STATES PATENT OFFICE 2,408,559

SELF-SETTING TUBULAR RIVET

Herbert J. Keating, Pasadena, Calif., assignor to Cherry Rivet Company, Los Angeles, Calif., a corporation of California Application June 19, 1945, Serial No. 600,332

2 Claims. (Cl. 85—40)

My invention relates to tubular rivets and has particular reference to a self-setting tubular rivet of the blind rivet type adapted to be inserted in aligned holes in a pair of workpieces to be secured together by said rivet and in which a rotary movement imparted to the rivet assembly will first draw the workpieces into tight engagement with each other and then the protruding end of the tubular rivet will be upset to secure the rivet firmly in place in the workpieces.

In the art of riveting two or more workpieces together such as two or more sheets of metal or similar material which are required to be secured together, it is the common practice to bore holes through the superimposed work sheets and extend therethrough a rivet which when upset will firmly hold the workpieces together. In many situations the locations of the workpieces are such that it is impossible to obtain access to the rear side of the workpieces and in such cases a blind rivet must be used comprising a rivet body having a shank sufficiently long to project through the superimposed workpieces and to extend beyond the inner side of the inner workpiece, the rivet assembly including a mandrel extending through the rivet body and adapted to be actuated from the front side of the workpieces or work sheets to upset the protruding end of the rivet to thereby secure the rivet in place.

Frequently it occurs that the superimposed workpieces do not have their faces in intimate contact with each other prior to the riveting operation and it is, therefore, desirable that the operation of upsetting the rivet should first draw the work sheets or workpieces into the desired relation with each other and then the protruding end of the rivet body shank should be upset to secure the rivet in place.

It is, therefore, an object of my invention to provide a tubular rivet of the blind rivet type which may be so manipulated as to first cause the workpiece to be drawn tightly against each other prior to the upsetting of the protruding end of the rivet.

Another object of my invention is to provide a tubular rivet of the character described wherein the securing of the workpieces in tight relation to each other is accomplished by employing a rivet having a shank, a portion of which is adapted to protrude through the inner work sheet and is provided with external threads to engage threads on the rivet opening in the inner work sheet, the remainder of the shank of the rivet being cylindrical and smooth whereby a rotational movement imparted to the rivet will cause the head of the rivet to be drawn into contact with the outer work sheet and then continued rotary movement will cause all of the work sheets to be tightly clamped together prior to the upsetting of the protruding end of the rivet.

Another object of my invention is to provide a tubular rivet of the character described wherein the rotary movement imparted to the rivet assembly is imparted through the mandrel, the mandrel being threaded into the rivet body with threads, the pitch of which is opposed to the external threads on the shank, whereby rotating the mandrel will first rotate the entire assembly until the work sheets have been drawn tightly together and then continued rotary movement imparted to the mandrel will cause the mandrel to be drawn inwardly of the rivet body to upset the protruding end of the rivet body shank.

Another object of my invention is to provide a rivet of the character described wherein the rivet mandrel may be manipulated to perform first the functions of tightening the workpieces or work sheets upon each other and then to upset the protruding end of the rivet body shank without requiring any such tools as are required for imparting an axial pull between rivet bodies and their mandrels in the ordinary blind rivet construction.

Other objects and advantages of my invention will be apparent from a study of the following specifications, read in connection with the accompanying drawing, wherein:

Fig. 1 is a vertical sectional view taken through a rivet assembly constructed in accordance with my invention and illustrating the position of the parts when initially inserted together in aligned rivet holes in a pair of workpieces or work sheets;

Fig. 2 is a view similar to Fig. 1 and illustrating the position of the parts at the end of the upsetting operations; and Fig. 3 is a view similar to Figs. 1 and 2 and illustrating the position of the parts at the end of the upsetting operations and after the stem of the mandrel has been broken off.

Referring to the drawing, I have illustrated a pair of workpieces A and B as a pair of sheets of material to be secured together by means of a rivet assembly comprising a rivet body 1 and a mandrel 2 extending longitudinally therethrough.

The rivet body 1 is provided with an enlarged head portion 3 and a tubular shank portion 4, the length of which is sufficient to pass through both of the work sheets and to protrude a sufficient distance inwardly of the inner work sheet B to permit of the upsetting of the protruding end of the rivet shank to secure the rivet in place. The shank 4 of the rivet body is illustrated as having the portion immediately adjacent the head formed with a smooth cylindrical exterior surface adapted to be received in a smooth cylindrical bore or rivet hole C formed in the outer work sheet A, the remaining portions of the shank of the rivet body being threaded as indicated at 5 for threaded reception in a threaded bore or rivet hole D formed in the inner work sheet B.

The mandrel 2 is disposed to extend through a longitudinal bore 6 extending throughout the length of the rivet body head and shank, a portion of the bore adjacent the head 3 being threaded as indicated at 7 to receive a threaded portion 8 of the mandrel 2.

By referring particularly to Fig. 1, it will be observed that the mandrel has an enlarged upsetting head 9 formed on its extreme inner end while between the head 9 and the threaded portion 8 there is a smooth cylindrical portion 10 adapted to be received in a smooth surfaced portion of the bore 6. The mandrel 2 is provided with a protruding stem portion 11 preferably flattened as indicated at 12 at its extreme outer end to permit the engagement therewith of any suitable tool such as a wrench, pair of pliers or the like for imparting a rotary motion to the assembly.

It should be noted from an inspection of Fig. 1 that the external threads on the rivet shank have a pitch in one direction, for example, right-hand, while the threads 7 on the interior of the shank have a pitch in the opposite direction, for example, left-hand, so that when the rivet assembly is to be inserted into the aligned holes C and D in a pair of workpieces a right-hand rotary motion imparted to the mandrel stem 11 will first cause the shank of the rivet body to be screwed into the threaded hole D in the inner workpiece until the under surface of the rivet body head is drawn into engaging relation with the outer surface of the outer workpiece A and any further rotary movement imparted to the rivet body will result in drawing the two workpieces into tight relation one upon the other. During this initial rotary movement, the fact that the threads between the mandrel and the rivet body bore are in an opposite direction to the threads exteriorly of the rivet body shank, there will be no relative rotary movement between the mandrel and the body.

When the rotary motion of the rivet body is stopped as the plates or workpieces are drawn into tight relation with each other, a further right-hand rotary motion imparted to the mandrel stem will cause the mandrel to be screwed into the rivet body in such direction as will draw the upsetting head 9 of the mandrel into the bore 6 of the body, with the result that the protruding end 13 of the rivet body shank will be radially expanded as indicated in Fig. 2 to securely fix the rivet assembly in place.

When the mandrel has been drawn inwardly of the rivet body shank to completely upset the protruding end of the shank, the resistance to further inward movement of the mandrel will be such as to cause the mandrel stem 11 to break when further rotary force is exerted on the mandrel, and I prefer to provide an annular groove 14 about the stem 11 at such position spaced from the upsetting head 9 as to cause the mandrel to break at a point which will be approximately flush with the outer surface of the head 3 of the rivet body, such condition being illustrated in Fig. 3, wherein the protruding end 13 of the rivet body shank has been expanded or upset to secure the rivet assembly in place and the mandrel has been broken off at the groove 14 approximately flush with the outer surface of the head of the rivet body.

From the foregoing it will be apparent that a tubular rivet constructed in accordance with my invention provides not only for the upsetting of the shank of the rivet body but also provides for an initial exertion of forces tending to draw the workpieces together and a subsequent expansion of the shank of the rivet body to secure the rivet in place. By employing the rotary movement as distinguished from an axial pull exerted between the rivet body and mandrel and utilizing the threaded interengagement of the mandrel with the rivet body, backlash or tendency for the mandrel to move outwardly in the rivet body at the instant of fracture of the stem is avoided and a tight engagement between the rivet body and mandrel at the end of the upsetting operations is assured.

It will be apparent also from the foregoing that with a rivet assembly as illustrated and described herein, the rivets may be readily set by a workman using any conventional tool adapted to grip the extending stem of the mandrel to impart a rotary motion thereto, such as wrenches, pliers and the like, which are readily available to the workman, and the assembly requires no special tool for its insertion and manipulation.

While I have shown and described the preferred embodiment of my invention, I do not desire to be limited to any of the details of construction shown and described herein, except as defined in the appended claims.

I claim:

1. In a tubular rivet assembly for securing a pair of workpieces together, a rivet body having a head and a shank extending therefrom for reception in aligned holes in an outer and inner workpiece to be secured together, said shank having a length sufficient to permit it to pass through the workpieces and protrude beyond the inner surface of the inner workpiece, threads on the exterior of said shank to threadedly engage at least the inner workpiece, a longitudinal bore extending through said shank and having threads threaded to a pitch opposed to the external threads on said shank, a mandrel disposed in said bore and threadedly engaging the threads in said bore, said mandrel having an enlarged head at one of its ends disposed adjacent the end of the shank, and a stem extending beyond the head of the rivet body whereby rotary movement imparted to the stem of said mandrel will first thread the shank into the workpieces and further rotary movement imparted to said stem will cause said mandrel to be moved inwardly of said rivet body to expand the end of said shank into riveted relation with said workpieces.

2. In a rivet assembly, the combination of a rivet body having a head and a shank extending therefrom adapted to extend through aligned holes in outer and inner workpieces to be riveted together, said shank having that portion of its length which is to be disposed within the hole in the inner workpiece threaded and the remainder of said shank being unthreaded for reception in a smooth surfaced hole in the outer work sheet, a longitudinal bore extending through said rivet body, head and shank, and a mandrel disposed in said bore and having threaded engagement with said bore, said mandrel including an enlarged upsetting head disposed adjacent the inner end of the shank and a stem portion extending outwardly of the head of the rivet body, the pitch of the threads on the exterior of the shank and the threads on the mandrel and bore being opposed to each other whereby rotary movement imparted to the stem portion of said mandrel will first cause said shank to be threaded into an inner workpiece until the workpieces are clamped in tight relation to each other and further rotary movement imparted to said stem will cause said mandrel head to be drawn inwardly of the shank to upset the end of the shank.

HERBERT J. KEATING.